United States Patent
Werlang et al.

(10) Patent No.: US 11,396,592 B2
(45) Date of Patent: Jul. 26, 2022

(54) NO BREAK POLYPROPYLENE IMPACT COPOLYMERS WITH MELT FLOW RATE HIGHER THAN 90 G/10 MIN

(71) Applicant: Braskem S.A., Camaçari (BR)

(72) Inventors: Moisés Magalhães Werlang, São Paulo (BR); Joel Carr, Pittsburgh, PA (US); Tadeu Forest, São Paulo (BR)

(73) Assignee: Braskem S.A., Camaçari (BR)

( * ) Notice: Subject to any disclaimer, the term of this patent is extended or adjusted under 35 U.S.C. 154(b) by 42 days.

(21) Appl. No.: 16/794,564

(22) Filed: Feb. 19, 2020

(65) Prior Publication Data

US 2020/0263016 A1    Aug. 20, 2020

Related U.S. Application Data

(60) Provisional application No. 62/807,486, filed on Feb. 19, 2019.

(51) Int. Cl.
*C08L 23/16* (2006.01)
*C08L 23/12* (2006.01)
*C08L 23/14* (2006.01)

(52) U.S. Cl.
CPC ............... *C08L 23/12* (2013.01); *C08L 23/14* (2013.01); *C08L 23/16* (2013.01); *C08L 2205/02* (2013.01); *C08L 2205/025* (2013.01); *C08L 2207/02* (2013.01)

(58) Field of Classification Search
None
See application file for complete search history.

(56) References Cited

U.S. PATENT DOCUMENTS

| | | | |
|---|---|---|---|
| 2009/0209706 A1* | 8/2009 | Sheard | C08L 23/142 526/348 |
| 2011/0015316 A1* | 1/2011 | Zummallen | B29C 48/92 524/115 |
| 2013/0095542 A1 | 4/2013 | Pereira et al. | |
| 2014/0107274 A1 | 4/2014 | Salek et al. | |

FOREIGN PATENT DOCUMENTS

| | | |
|---|---|---|
| EP | 3015504 A1 | 5/2016 |
| WO | 200158970 A1 | 8/2001 |
| WO | 2011008589 A1 | 1/2011 |
| WO | 2015138305 A1 | 9/2015 |

OTHER PUBLICATIONS

International Search Report issued in International Application No. PCT/IB2020/020011, dated Jul. 20, 2020 (9 pages).
Written Opinion issued in International Application No. PCT/IB2020/020011, dated Jul. 20, 2020 (9 pages).

* cited by examiner

*Primary Examiner* — Richard A Huhn
(74) *Attorney, Agent, or Firm* — Osha Bergman Watanabe & Burton LLP

(57) ABSTRACT

Polymer compositions may include a matrix phase comprising a polypropylene-based polymer; and an elastomeric rubber phase; wherein the polymer composition has melt flow rate (MFR) according to ASTM D1238 at 230° C./2.16 kg equal to or greater than 90 g/10 min and at least one feature selected from (I) an Izod impact resistance according to ASTM D256A at 23° C. equal to or greater than 400 J/m; (II) an instrumented drop impact at −30° C., average total energy, equal to or greater than 17 J; or (III) an instrumented drop impact at −30° C., average percent ductility, equal to or greater than 60%.

17 Claims, No Drawings

NO BREAK POLYPROPYLENE IMPACT COPOLYMERS WITH MELT FLOW RATE HIGHER THAN 90 G/10 MIN

BACKGROUND

Polypropylene compositions have gained wide commercial acceptance and usage in numerous applications because of the relatively low cost of the polymers and the desirable properties they exhibit. In general, polypropylene polymers, particularly propylene homopolymers, have a disadvantage of being brittle with low impact resistance, especially at low temperatures. To combat these issues, manufacturers have incorporated a dispersed copolymer phase within the polypropylene matrix to generate impact copolymers (ICPs) that exhibit improved impact resistance.

While polypropylene ICP formulations have many beneficial applications, such materials have inherent physical limitations that can limit their use in the production of larger and thinner parts, particularly in packaging and automotive applications. Products in these fields are often injection molded, where the ideal resin will have as high of a MFR as possible. However, balanced with the need for high MFR is the requirement that ICPs also maintain suitable impact resistance, which is often lost in processes that increase MFR.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to polymer compositions that may include a matrix phase including a polypropylene-based polymer; and an elastomeric rubber phase; wherein the polymer composition has melt flow rate (MFR) according to ASTM D1238 at 230° C./2.16 kg equal to or greater than 90 g/10 min and at least one feature selected from (I) an Izod impact resistance according to ASTM D256A at 23° C. equal to or greater than 400 J/m; (II) an instrumented drop impact at −30° C., average total energy, equal to or greater than 17 J; or (III) an instrumented drop impact at −30° C., average percent ductility, equal to or greater than 60%.

In another aspect, embodiments disclosed herein are directed to polymer compositions that may include a matrix phase including a polypropylene-based polymer; and an elastomeric rubber phase including a propylene copolymer including equal to or less than 35 wt % of one or more comonomers, wherein the polymer composition has melt flow rate (MFR) according to ASTM D1238 at 230° C./2.16 kg equal to or greater than 90 g/10 min and a fraction of solubles in xylene according to ASTM D5492 equal to or greater than 20 wt %, wherein the polymer composition has been modified by visbreaking with a peroxide agent.

In another aspect, embodiments disclosed herein are directed to methods that include preparing a reactor polymer composition comprising at least a matrix phase including a polypropylene and at least an elastomeric rubber phase including a propylene copolymer, wherein propylene copolymer includes equal to or less than 35 wt % of comonomers selected from ethylene or C4-C10 alpha-olefins, wherein the reactor polymer composition exhibits a melt flow rate (MFR) according to ASTM D1238 at 230° C./2.16 kg ranging from 10 to 50 g/10 min; adding a peroxide agent to the reactor polymer mixture in an extruder; and obtaining a visbroken polymer composition having a MFR according to ASTM D1238 at 230° C./2.16 kg equal to or greater than 90 g/10 min.

Other aspects and advantages of the claimed subject matter will be apparent from the following description and the appended claims.

DETAILED DESCRIPTION

Embodiments of the present disclosure are directed to polypropylene-based impact copolymer (ICP) compositions having high melt flow rates (MFR) and high Izod impact resistance. ICP compositions include a polymer matrix and an elastomeric rubber phase that exhibits melt strength and melt flow rates suitable for a number of applications including injection molding and extrusion to produce articles with excellent impact resistance and stiffness. In one or more embodiments, polypropylene ICPs in accordance with the present disclosure may have a melt flow rate of equal to or greater than 90 g/10 min (230° C./2.16 kg) and Izod impact resistance equal to or higher than 400 J/m. In particular embodiments, ICPs may have a melt flow rate at 230° C./2.16 kg that ranges from a lower limit selected from any one of 80 g/10 min, 90 g/10 min, and 100 g/10 min, to an upper limit selected from any one of 170 g/10 min, 180 g/10 min, and 190 g/10 min, where any lower limit may be paired with any upper limit. In particular embodiments, ICPs may have an Izod impact resistance that ranges from a lower limit selected from any one of 300 J/m, 400 J/m, and 500 J/m, to an upper limit selected from any one of 700 J/m, 800 J/m, and 900 J/m, where any lower limit may be paired with any upper limit.

ICP compositions in accordance with the present disclosure may also be referred to as "heterophasic polypropylene" containing a continuous matrix (continuous phase) and an elastomeric rubber phase (also known as internal rubber phase or discontinuous phase). ICPs are generated by incorporating an elastomeric rubber phase into a matrix polymer, which results in a polymer composition having modified bulk properties, including noticeable changes in impact resistance and modulus. For ICPs, however, there is often an inverse proportionality between MFR and impact strength as a function of molecular weight. For example, ICPs formulated from linear polymers such as polypropylene often have low impact strength at low molecular weights that increases with increasing molecular weight. Similarly, the MFR is correspondingly higher at lower molecular weights and decreases with increasing molecular weight.

Methods in accordance with the present disclosure may include enhancing the MFR for polypropylene ICPs using visbreaking methods with peroxide agents to enhance MFR, while maintaining favorable physical properties such as impact resistance and flexural modulus. Polymer visbreaking is often performed by adding a peroxide agent to a polymer composition during extrusion processing to reduce molecular weight, decrease melt viscosity, and narrow molecular weight distribution (MWD). However, as molecular weight decreases, the number of entanglements among the polymers chains decrease, which results in a corresponding decrease in physical properties such as impact resistance.

In the case of polypropylene ICPs, it has been found that the proportion of ethylene in the elastomeric rubber phase increases the percentage of amorphous domain within the composition, which affects structural changes that occur during visbreaking and the resulting mechanical properties obtained for the final ICP composition. Particularly, ethylene monomers used to formulate rubber to produce ICPs may form polyethylene-like domains during polymerization in gas phase reactors that tends to react with radicals produced during subsequent visbreaking processes. Based on rheological data obtained, the polyethylene component of the rubber appears to consume free radicals during the visbreaking reaction through the formation of crosslinks, reducing the MFR and increasing zero shear viscosity. These effects result in suboptimal properties for visbroken polymer compositions, and are proportional to the ethylene content in the elastomeric rubber phase.

For example, when high rubber content ICPs, such as those having equal to or greater than 20 wt % of xylene solubles fraction, are formulated with a propylene rubber having a comonomer content in the amorphous phase of equal to or lower than 35 wt %, visbreaking produces ICP compositions having a MFR higher than 90 g/10 min (230° C./2.16 kg) and Izod impact resistance equal to or greater than 400 J/m, which is considered "no break" behavior. In contrast, polypropylene ICPs prepared having elastomeric rubber phases incorporating greater than 35 wt % ethylene, exhibit substantially reduced impact resistance for similar MFR values.

Matrix Polymer

ICP compositions in accordance with the present disclosure may include a matrix polymer phase composed of polypropylene-based polymer. The matrix polymer may be a polypropylene homopolymer or a propylene copolymer. In one or more embodiments, the matrix polymer may be monomodal or bimodal.

In one or more embodiments, a matrix polymer may be a propylene copolymer having 5 wt % or less of comonomer selected from any of one or more of ethylene and C4 to C10 alkenes, including linear monomers such as alpha-olefins and comonomers with various degrees of branching.

In one or more embodiments, ICP polymer compositions may contain a percent by weight of the total composition (wt %) of matrix polymer ranging from a lower limit selected from one of 60 wt %, 65 wt %, and 70 wt %, to an upper limit selected from one of 72 wt %, 75 wt %, and 80 wt %, where any lower limit can be used with any upper limit.

Elastomeric Rubber Phase

ICP compositions in accordance with the present disclosure may contain an elastomeric rubber phase that is prepared from a propylene copolymer containing propylene and least one comonomer selected from one or more of ethylene and C4 to C10 alkenes, including linear monomers such as alpha-olefins and comonomers with various degrees of branching. Rubbers in accordance with the present disclosure may have varying compositions and molecular weight (MW). In one or more embodiments, rubbers may have a molecular weight distribution (MWD, Mw/Mn) measured by GPC-3D (3 detectors), light scattering, viscosity and infrared detector of both fractions that is equal to or greater than 10. In particular embodiments, rubbers may have a MWD that ranges from a lower limit selected from any one of 8, 10, and 12, to an upper limit selected from any one of 20, 23, and 26, where any lower limit may be paired with any upper limit.

In one or more embodiments, the comonomer of the elastomeric rubber phase is ethylene.

In one or more embodiments, the elastomeric rubber phase is present in the ICP composition at a percent by weight (wt %) of the total composition ranging from a lower limit selected from any one of 20 wt %, 25 wt %, and 28 wt %, to an upper limit selected from any one of 30 wt %, 35 wt %, and 40 wt %, where any lower limit may be paired with any upper limit.

In one or more embodiments, an elastomeric rubber phase may comprise a comonomer at a percent by weight (wt %) of the elastomeric rubber phase ranging from a lower limit selected from any one of 5 wt %, 10 wt %, and 15 wt %, to an upper limit selected from any one of 25 wt %, 30 wt %, and 35 wt %, where any lower limit may be paired with any upper limit. In some embodiments, an elastomeric rubber phase may contain a comonomer at a wt % of equal to or less than 35 wt %. In some embodiments, an elastomeric rubber phase may contain a comonomer at a wt % of equal to or less than 5 wt %. In some embodiments, an elastomeric rubber phase may contain an ethylene comonomer at a wt % of equal to or less than 35 wt %.

In one or more embodiments, ICP polymer compositions may include biobased and recycled polypropylene produced from propylene monomers, including polypropylene of varying molecular weight and density, and blends and mixtures thereof. Polypropylenes and copolymers in accordance with the present disclosure may include polyolefins containing a weight percentage of biologically derived monomers. Propylene monomers may be derived from similar biological processes as discussed, for example, in U.S. Pat. Pub. 2013/0095542. In one or more embodiments, biologically derived n-propanol may be dehydrated to yield propylene, which is then polymerized to produce various types of polypropylene. In one or more embodiments, biobased products obtained from natural materials may be certified as to their renewable carbon content, according to the methodology described in the technical standard ASTM D 6866-06, "Standard Test Methods for Determining the Biobased Content of Natural Range Materials Using Radiocarbon and Isotope Ratio Mass Spectrometry Analysis."

Physical Properties

In one or more embodiments, ICP compositions may have an Izod impact according to ASTM D256A at 23° C. after visbreaking that is equal to or greater than 400 J/m. In some embodiments, the Izod impact after visbreaking is equal to or greater than 490 J/m. In some embodiments, ICP compositions may have an Izod impact according to ASTM D256A at 23° C. after visbreaking that ranges from a lower limit selected from any one of 300 J/m, 400 J/m, and 500 J/m, to an upper limit selected from any one of 700 J/m, 800 Jim, and 900 J/m, where any lower limit may be paired with any upper limit. In a particular embodiment, ICP compositions may have an Izod impact according to ASTM D256A at 23° C. after visbreaking in the range of 400 to 800 J/m.

In one or more embodiments, ICP compositions may have an instrumented drop impact at −30° C., average percent ductility, measured according to ASTM D3763 after visbreaking equal to or higher than 60%. In some embodiments, ICP compositions may have an instrumented drop impact at −30° C., average percent ductility, measured according to ASTM D3763 after visbreaking equal to or higher than 80%. In particular embodiments, ICP compositions may have an instrumented drop impact at −30° C., average percent ductility, measured according to ASTM D3763 after visbreaking that ranges from a lower limit selected from any one of 75%, 80%, and 85%, to an upper limit selected from any one of 90%, 95%, and 100%, where any lower limit may be paired with any upper limit.

In one or more embodiments, ICP compositions may have an instrumented drop impact at −30° C., average total energy, after visbreaking equal to or greater than 17 J. In particular embodiments, ICP compositions may have an instrumented drop impact at −30° C., average total energy, after visbreaking that ranges from a lower limit selected from any one of 16J, 17J, and 18J, to an upper limit selected from any one of 21J, 22J, and 23J, where any lower limit may be paired with any upper limit.

In one or more embodiments, ICP compositions after visbreaking may have an Izod impact according to ASTM D256A −20° C. that is equal to or greater than 55 J/m. In some embodiments, polymer composition may have an Izod impact according to ASTM D256A at −20° C. in the range of 55 to 150 J/m.

In one or more embodiments, ICP compositions may have a fraction of xylene solubles according to ASTM D5492 in a range having a lower limit selected from any of 20%, 25%, and 28%, to an upper limit selected from any of 30%, 35%, and 40%, where any lower limit may be paired with any upper limit.

In one or more embodiments, ICP compositions may have a MFR prior to the visbreaking measured according to ASTM D1238, Procedure B, Condition 230° C./2.16 kg in a range having a lower limit selected from any of 10 g/10 min, 15 g/10 min, 20 g/10 min, 25 g/10 min, and 30 g/10 min, to an upper limit selected from any of 30 g/10 min, 35 g/10 min, 40 g/10 min, 45 g/10 min, and 50 g/10 min where any lower limit may be paired with any upper limit.

In one or more embodiments, ICP compositions may have a MFR after visbreaking measured according to ASTM D1238 at 230° C./2.16 kg that is equal to or greater than 90 g/10 min. In some embodiments, ICP compositions may have a melt flow rate (MFR) according to ASTM D1238 at 230° C./2.16 kg equal to or greater than 90 g/10 min after visbreaking and a fraction of solubles in xylene according to ASTM D5492 in the range of 20% to 40%.

In one or more embodiments, ICP compositions may have a comonomer content in the amorphous phase determined according to ASTM D5576 at a percent by weight (wt %) equal to or lower than 35 wt %. In some embodiments, ICP compositions may have a comonomer content in the amorphous phase determined according to ASTM D5576 in a range having a lower limit selected from any one of 15 wt %, 18 wt %, and 20 wt %, to an upper limit selected from any one of 30 wt %, 34 wt %, and 35 wt %, where any lower limit may be combined with any upper limit.

In one or more embodiments, ICP compositions may have an amorphous intrinsic viscosity (IV) prior to visbreaking as determined by ASTM D445 in decaline at 135° C. in a range having a lower limit selected from any one of 1.9 dL/g, 2.0 dL/g, and 2.2 dL/g, to an upper limit selected from any one of 2.5 dL/g, 3.0 dL/g, and 3.6 dL/g, where any lower limit may be combined with any upper limit.

In one or more embodiments, ICP compositions may have an amorphous intrinsic viscosity (IV) after visbreaking as determined by ASTM D445 in decaline at 135° C. in a range having a lower limit selected from any one of 0.9 dL/g, 1.0 dL/g, and 1.2 dL/g, to an upper limit selected from any one of 1.8 dL/g, 2.0 dL/g, and 2.2 dL/g, where any lower limit may be combined with any upper limit.

In one or more embodiments, ICP compositions may have a flexural modulus secant at 1% determined according to ASTM D790 equal to or greater than 600 Mpa. In particular embodiments, ICP compositions may have may have a flexural modulus secant at 1% determined according to ASTM D790 that ranges from a lower limit selected from any one of 550 MPa, 600 MPa, and 650 MPa, to an upper limit selected from any one of 850 MPa, 900 MPa, and 950 MPa, where any lower limit may be paired with any upper limit.

In one or more embodiments, ICP compositions may have a tensile at yield equal to or greater than 14 MPa. In particular embodiments, ICP compositions may have an a tensile at yield that ranges from a lower limit selected from any one of 12 MPa, 14 MPa, and 16 MPa, to an upper limit selected from any one of 18 MPa, 20 MPa, and 22 MPa, where any lower limit may be paired with any upper limit.

In one or more embodiments, ICP compositions may have a molecular weight distribution (MWD, Mw/Mn) as measured by GPC-3D (3 detectors), light scattering, viscosity and infrared detector of both fractions that is equal to or greater than 5. In some embodiments, ICP compositions may have a MWD that is equal to or greater than 10. In particular embodiments, ICP compositions may have a MWD that ranges from a lower limit selected from any one of 5, 7, and 9, to an upper limit selected from any one of 10, 12, and 14, where any lower limit may be paired with any upper limit.

In one or more embodiments, ICP compositions may have a z-average molecular weight (Mz) after visbreaking in the range of 400 kDa to 600 kDa.

Synthesis

In one or more embodiments, polypropylene ICP compositions may be prepared in a multistage polymerization process. In some embodiments, a polypropylene-based matrix polymer may be produced in a first and second reactor and a discontinuous rubber phase may be produced using two or more gas phase reactors. ICP compositions may be prepared using any suitable catalyst, such as a Ziegler-Natta catalyst. In some embodiments, the MFR of the propylene-based matrix polymer may be controlled by adjusting the concentration of hydrogen gas present in the first reactors and available for interaction with a Ziegler-Natta catalyst in accordance with known polymerization methods. After the polymerization, polypropylene ICP compositions may be visbroken with any suitable peroxide agent to achieve a target MFR.

Visbreaking

Following ICP synthesis, ICPs may be visbroken by adding a visbreaking agent, such as a peroxide agent, to the copolymer during extrusion to increase its melt flow rate. The visbreaking can be carried out in a pelletizing extruder in some embodiments, and may be pelletized prior to visbreaking in some embodiments. For example, a solution of peroxide in mineral oil or alcohol can be mixed with an ICP polymer or added to the polymer at the throat of an extruder.

Extrusion temperatures will depend, at least in part, on the visbreaking agent employed. In one or more embodiments, the visbreaking temperature should be high enough to ensure that the visbreaking agent reacts during the visbreaking process. In some embodiments, extruder temperatures during visbreaking may be equal to or greater than 120° C.

Peroxide Agent

Visbreaking of polymer compositions in accordance with the present disclosure may be performed by the addition of one or more peroxide agents. Peroxide agents in accordance with the present disclosure may undergo decomposition during an extrusion reaction, which can reduce overall length and molecular weight of polymer chains in a polymer composition, but may also introduce some level of inter- and intra-strand crosslinking. In one or more embodiments, peroxide agents may include inorganic and organic peroxides, which may encompass linear and cyclic peroxides.

Peroxide agents in accordance with the present disclosure may include linear or cyclic organic peroxides such as benzoyl peroxide, dicumyl peroxide, di-tert-butyl peroxide, tert-butyl cumyl peroxide, tert-butyl 3,5,5-trimethylhexanoate peroxide, tert-butyl peroxybenzoate, 2-ethylhexyl carbonate tert-butyl peroxide, 2,5-dimethyl-2,5-di(tert-butylperoxide) hexane, 1,1-di(tert-butylperoxide)-3,3,5-trimethylcyclohexane, 2,5-dimethyl-2,5-di(tertbutylperoxide) hexyne-3,3,3,5,7,7-pentamethyl-1,2,4-trioxepane, Butyl 4,4-di(tert-butylperoxide) valerate, di(2,4-dichlorobenzoyl) peroxide, di(4-methylbenzoyl) peroxide, peroxide di(tert-butylperoxyisopropyl) benzene, 2,5-di(cumylperoxy)-2,5-dimethylhexane, 2,5-di(cumylperoxy)-2,5-dimethylhexyne-3,4-methyl-4-(t-butylperoxy)-2-pentanol, 4-methyl-4-(t-amylperoxy)-2-pentanol, 4-methyl-4-(cumylperoxy)-2-pentanol, 4-methyl-4-(t-butylperoxy)-2-pentanone, 4-methyl-4-(t-amylperoxy)-2-pentanone, 4-methyl-4-(cumylperoxy)-2-pentanone, 2,5-dimethyl-2,5-di(t-butylperoxy)hexane, 2,5-dimethyl-2,5-di(t-amylperoxy)hexane, 2,5-dimethyl-2,5-di(t-butylperoxy)hexyne-3,2,5-dimethyl-2,5-di(t-amylperoxy)hexyne-3,2,5-dimethyl-2-t-butylperoxy-5-hydroperoxyhexane, 2,5-dimethyl-2-cumylperoxy-5-hydroperoxyhexane, 2,5-dimethyl-2-t-amylperoxy-5-hydroperoxyhexane, m/p-alpha, alpha-di[(t-butylperoxy)isopropyl]benzene, 1,3,5-tris(t-butylperoxyisopropyl)benzene, 1,3,5-tris(t-amylperoxyisopropyl)benzene, 1,3,5-tris(cumylperoxyisopropyl)benzene, di[1,3-dimethyl-3-(t-butylperoxy)butyl]carbonate, di[1,3-dimethyl-3-(t-amylperoxy)butyl]carbonate, di[1,3-dimethyl-3-(cumylperoxy)butyl]carbonate, di-t-amyl peroxide, t-amyl cumyl peroxide, t-butylisopropenylcumyl peroxide, 2,4,6-tri(butylperoxy)-s-triazine, 1,3,5-tri[1-(t-butylperoxy)-1-methylethyl]benzene, 1,3,5-tri-[(t-butylperoxy)-isopropyl]benzene, 1,3-dimethyl-3-(t-butylperoxy)butanol, 1,3-dimethyl-3-(t-amylperoxy)butanol, di(2-phenoxyethyl) peroxydicarbonate, di(4-t-butyl cyclohexyl) peroxydicarbonate, dimyristyl peroxydicarbonate, dibenzyl peroxydicarbonate, di(isobornyl)peroxydicarbonate, 3-cumylperoxy-1,3-dimethylbutyl methacrylate, 3-t-butylperoxy-1,3-dimethylbutyl methacrylate, 3-t-amylperoxy-1,3-dimethylbutyl methacrylate, tri (1,3-dimethyl-3-t-butylperoxy butyl oxy)vinyl silane, 1,3-dimethyl-3-(t-butylperoxy)butyl N-[1-{3-(1-methylethenyl)-phenyl) 1-methylethyl]carbamate, 1,3-dimethyl-3-(t-amylperoxy)butyl N-[1-{3 (1-methylethenyl)-phenyl}-1-methylethyl]carbamate, 1,3-dimethyl-3-(cumylperoxy))butyl N-[1-{3-(1-methylethenyl)-phenyl}-1-methylethyl]carbamate, 1,1-di(t-butylperoxy)-3,3,5-trimethylcyclohexane, 1,1-di(t-butylperoxy)cyclohexane, n-butyl 4,4-di(t-amylperoxy)valerate, ethyl 3,3-di(t-butylperoxy)butyrate, 2,2-di(t-amylperoxy)propane, 3,6,6,9,9-pentamethyl-3-ethoxycabonylmethyl-1,2,4,5-tetraoxacyclononane, n-buty 1-4,4-bis(t-butylperoxy)valerate, ethyl-3,3-di(t-amylperoxy)butyrate, benzoyl peroxide, OO-t-butyl-O-hydrogen-monoperoxy-succinate, OO-t-amyl-O-hydrogen-monoperoxy-succinate, 3,6,9, triethyl-3,6,9-trimethyl-1,4,7-triperoxynonane (or methylethyl ketone peroxide cyclic trimer), methylethyl ketone peroxide cyclic dimer, 3,3,6,6,9,9-hexamethyl-1,2,4,5-tetraoxacyclononane, 2,5-dimethyl-2,5-di(benzoylperoxy)hexane, t-butyl perbenzoate, t-butylperoxy acetate, t-butylperoxy-2-ethylhexanoate, t-amyl perbenzoate, t-amyl peroxy acetate, t-butyl peroxy isobutyrate, 3-hydroxy-1,1-dimethyl t-butyl peroxy-2-ethylhexanoate, OO-t-amyl-O-hydrogen-monoperoxy succinate, OO-t-butyl-O-hydrogen-monoperoxy succinate, di-t-butyl diperoxyphthalate, t-butylperoxy (3,3,5-trimethylhexanoate), 1,4-bis(t-butylperoxycarbo)cyclohexane, t-butylperoxy-3,5,5-trimethylhexanoate, t-butyl-peroxy-(cis-3-carb oxy)propionate, allyl 3-methyl-3-t-butylperoxy butyrate, OO-t-butyl-O-isopropylmonoperoxy carbonate, OO-t-butyl-O-(2-ethylhexyl)monoperoxy carbonate, 1,1,1-tris[2-(t-butylperoxy-carbonyloxy)ethoxymethyl]propane, 1,1,1-tris[2-(t-amylperoxy-carbonyloxy)ethoxymethyl]propane, 1,1,1-tris[2-(cumylperoxycabonyloxy)ethoxymethyl]propane, OO-t-amyl-O-isopropylmonoperoxy carbonate, di(4-methylbenzoyl)peroxide, di(3-methylbenzoyl)peroxide, di(2-methylbenzoyl)peroxide, didecanoyl peroxide, dilauroyl peroxide, 2,4-dibromo-benzoyl peroxide, succinic acid peroxide, dibenzoyl peroxide, di(2,4-dichloro-benzoyl)peroxide, and combinations thereof. Other suitable organic peroxides include those with one hour half lives at temperatures greater than 120° C. such as 2,5-bis (tert-butylperoxy)-2,5-dimethyl-hexanetert-butyl peroxy benzoate (TBPB), dicumyl peroxide, t-butyl-cumyl peroxide, di-t-butyl peroxide, cumene hydroperoxide, and 2,5-dimethyl-2,5-di-(t-butyl peroxy) hexyne.

In one or more embodiments, polymer compositions in accordance with the present disclosure may contain a percent by weight of the total composition (wt %) of one or more peroxide agents that ranges from a lower limit selected from one of 0.01 wt %, 0.1 wt %, 0.15 wt %, 0.4 wt %, 0.6 wt %, 0.75 wt % and 1 wt %, to an upper limit selected from one of 0.5 wt %, 1.25 wt %, 2 wt %, 4 wt %, and 5 wt %, where any lower limit can be used with any upper limit. Further, it is envisioned that the concentration of the peroxide agent may be more or less depending on the application of the final material.

Additives

In one or more embodiments, the ICP compositions may contain a number of other functional additives that modify various properties of the composition such as antioxidants such as phenolic and phosphitic antioxidants, pigments, fillers such as calcium carbonate and kaolin clays, reinforcements, adhesion-promoting agents, biocides, whitening agents, nucleating agents, anti-statics, anti-blocking agents, processing aids such as low molecular weight polyethylene waxes, ester waxes, paraffin wax, paraffin oils, mineral oils, napthenic oils, bis-stearamides, stearamides, calcium stearate, and stearic acid, ultraviolet absorbers, lubricants, flame-retardants, plasticizers, light stabilizers, and the like.

In one or more embodiments, ICP compositions may contain a percent by weight of the total composition (wt %) of one or more additives ranging from a lower limit selected from one of 0.001 wt %, 0.01 wt %, 0.05 wt %, 0.5 wt %, and 1 wt %, to an upper limit selected from one of 1.5 wt %, 2 wt %, 5 wt %, 7 wt %, and 15 wt % where any lower limit can be used with any upper limit. While a number of potential ranges for polymer additives have been introduced, the additives are not considered in the determination of the Emission Factor for the respective polymer composition.

Polymer Composition Preparation Methods

Polymer compositions in accordance with the present disclosure may be prepared by a number of possible polymer blending and formulation techniques, which will be discussed in the following sections.

Melt Blending

In one or more embodiments, ICP polymer compositions may be combined with a secondary polymer composition in a melt blend process. In one or more other embodiments, the polymer composition is combined with a secondary polymer composition in a dry blend process. Thus, the polymer may be formulated as a masterbatch formulation that may be diluted in a subsequent melt-blend or dry blend process to form a final ICP composition having improved properties. For example, the polymer composition may be initially formed, such as in a reactive extrusion process followed by visbreaking to form propylene ICP particles. The ICP polymer composition may be combined subsequently with a secondary polymer composition, such as by a conventional extrusion process, for example, to blend the polymers together, thereby forming an improved secondary polymer.

Solubilization

Polymer compositions in accordance with the present disclosure may be prepared from the constituent components using a number of techniques. In one or more embodiments, polymer components may be solubilized in a suitable organic solvent such as decalin, 1,2-dichlorobenzene, 1,1,1,3,3,3-hexafluor isopropanol, and the like. The solvent mixture may then be heated to a temperature, such as between 23° C. and 130° C., under stirring to blend the polymers. The composition may then be processed by visbreaking to yield the final ICP composition.

Extrusion

In one or more embodiments, polymer compositions in accordance with the present disclosure may be prepared using continuous or discontinuous extrusion. Methods may use single-, twin- or multi-screw extruders, which may be used at temperatures ranging from 100° C. to 270° C. in some embodiments, and from 140° C. to 230° C. in some embodiments. In some embodiments, raw materials are added to an extruder, simultaneously or sequentially, into the main or secondary feeder in the form of powder, granules, flakes or dispersion in liquids as solutions, emulsions and suspensions of one or more components.

Methods of preparing polymer compositions in accordance with the present disclosure may include the general steps of combining a matrix polymer and a rubber in an extruder; melt extruding the mixture as a blended ICP polymer composition with visbreaking; and forming pellets, films, sheets or molded articles from the blended polymer composition. In one or more embodiments, methods of preparing polymer compositions may involve a single extrusion or multiple extrusions following the blend preparation stages.

In one or more embodiments, polymer composition components can be pre-dispersed prior to extrusion using intensive mixers, for example. Inside an extrusion equipment, the components are heated by heat exchange and/or mechanical friction, the phases are melt and the dispersion occurs by the deformation of the polymer. In some embodiments, one or more compatibilizing agents (such as a functionalized polyolefin) between polymers of different natures may be used to facilitate and/or refine the distribution of the polymer phases and to enable the formation of the morphology of conventional blend and/or of semi-interpenetrating network at the interface between the phases.

In one or more embodiments, extrusion techniques in accordance with the present disclosure may also involve the preparation of a polymer composition concentrate (a masterbatch) that is then combined with other components to produce an ICP composition of the present disclosure.

Polymer compositions prepared by extrusion may be in the form of granules or pellets that are applicable to different molding processes, including processes selected from extrusion molding, coextrusion molding, extrusion coating, injection molding, injection blow molding, inject stretch blow molding, thermoforming, cast film extrusion, blown film extrusion, foaming, extrusion blow-molding, injection stretched blow-molding, rotomolding, pultrusion, calendering, additive manufacturing, lamination, and the like, to produce manufactured articles.

In one or more embodiments, the article is an injection molded article, a thermoformed article, a film, a foam, a blow molded article, an additive manufactured article, a compressed article, a coextruded article, a laminated article, an injection blow molded article, a rotomolded article, an extruded article, monolayer articles, multilayer articles, or a pultruded article, and the like. In embodiments of a multilayer article, it is envisioned that at least one of the layers comprises the polymer composition of the present disclosure.

Applications

Following visbreaking, compositions in accordance with the present disclosure may be used in downstream applications such as extrusion molding, coextrusion molding, extrusion coating, injection molding, cast film extrusion, blown film extrusion, foaming, extrusion blow-molding, injection stretched blow-molding, rotomolding, pultrusion, calendering, additive manufacturing, and lamination.

In one or more embodiments, polymer compositions may be used in the manufacturing of articles, including packaging for food products, chemicals, household chemicals, agrochemicals, fuel tanks, water and gas pipes, pipe coatings, geomembranes, and the like. Further examples of articles that may be produced using polymer compositions in accordance with the present disclosure include caps, closures, films, injected parts, hygienic absorbents, small volume blown articles, large volume blown articles, foams, expanded articles, thermoformed articles, household appliances, injected articles, domestic utilities, technical parts, air ducts, automotive parts and reservoirs, cylinders, perforated coils, geodesic blankets, bags, bags in general, housewares, diaper back cover, bedliner, cisterns, water boxes, boxes, bins, garbage collector, shoulders of pipes, tubes, ropes, oriented structures, biaxially-oriented films such as biaxial-oriented polypropylene (BOPP), plastic furniture, battery boxes, crates, plates, sheets, tubes, pipes, containers, electronic articles, textile articles, ribbons, raffia, tapes, filaments, drawers, ropes, fishing nets, technical coils, carpets, broomsticks, screens, archive tapes, bottles, profiles, thermal insulation, cups, pots, IBC (intermediate bulk container), packaging for cosmetics, packaging for hygiene and cleaning products, food packaging, multilayer packaging rigid, flexible multilayer packing, bungs, masterbatches, extrusion coating, packaging for pharmaceutical products, coextruded packaging, jars, tarpaulins, sacks, liner, laminate, tubes, kayaks, water tank, septic tanks, and other types of tanks.

EXAMPLES

In the following example, several ICP samples were prepared from an ICP containing a propylene matrix phase and a propylene/ethylene elastomeric rubber phase. Samples were assayed to determine the properties affected by varying the total xylene soluble fraction (XS) and ethylene content within the XS fraction. With particular reference to Table 1, the control samples S0, B0, and T0 indicate the properties of a reactor grade propylene ICP.

Samples of propylene-based ICP were prepared in a multistage polymerization process using a Ziegler-Natta catalyst, with XS after 2 first reactors below 4-3% and having a final XS content below 35%. The MFR of the final polymer compositions were adjusted by the amount of H2 in the first reactors available for interaction with the catalyst.

Next, polymers (samples S0, B0, and T0) were subjected to a visbreaking process using a Trigonox™ 101 peroxide agent. Different amounts of peroxide agent were added to increase the final MFR. Spheres from reactors were combined with antioxidants (phenolic and phosphite) and an acid neutralizer. Nucleating agents and clarifiers were also added during the extrusion process to modify mechanical properties. During the extrusion process, a twin screw extruder was used in combination with various quantities of peroxide agent. The obtained pellets were then injection molded to perform mechanical tests such as Izod impact resistance, flexural modulus and Instrumented Drop Impact Samples S0 to S3 were prepared with a final XS content below 35 wt % and an ethylene content in the rubber fraction (amorphous fraction) of the propylene-based ICP below 35%. After visbreaking, samples S2 and S3 achieved a MFR of 98 g/10 min and 115 g/10 min respectively. Both presented a "no break behavior" for a room temperature Izod test, indicating an Izod impact of greater than 400 J/m. Samples S1-S3 prepared in accordance with the present disclosure demonstrated a balance of impact resistance and stiffness, with a flexural modulus higher than 640 MPa and tensile at yield higher than 16 MPa.

Additional samples B0 and B3 had 30-35% XS and an amorphous ethylene content of 47 wt %. Sample B3 achieved a MFR of 98 g/10 min but it exhibited relatively poor impact resistance at room temperature that degraded further upon visbreaking with peroxide agent. Measurement of molecular weight for B0 and B3 samples indicates recombination between matrix polymer chains and possibly interaction at the interface between the dispersed rubber particles and the continuous phase.

Samples T0 to T4 were prepared with a XS content of 31 wt % and an ethylene content in the amorphous fraction of 33.1 wt %. Sample T2 presented a MFR of 95 g/10 min and an Izod at 23° C. of 539 J/m. All samples T1 to T4 presented an Instrumented Drop Impact at 30° C. equal to or greater than 80%.

All results are shown in Table 1. In the examples, XS was determined according to the ASTM D5492, MFR was determined according to ISO 1133 condition of 2.16 kg at 230° C., ethylene content in the amorphous phase was determined according to ASTM D5576, Izod impact resistance was determined according to ASTM D256, flexural modulus was determined according to ASTM D790 and Instrumented Drop Impact was determined according to ASTM D3763.

The XS fraction and ethylene content in the amorphous fraction were not determined for all the samples. It was assumed that for samples S1 to S3, B3 and T1 to T4 the XS content and ethylene content in the amorphous fraction would be similar to their corresponding starting materials (i.e., control samples S0, B0 and T0).

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A polymer composition, comprising:
   a matrix phase comprising a polypropylene-based polymer present in an amount ranging from 65 wt. % to 80 wt. %; and
   an elastomeric rubber phase present in an amount ranging from 20 wt. % to 35 wt. % based on the total amount of the polymer composition;
   wherein the elastomeric rubber phase comprises a copolymer of propylene and equal to or less than 35 wt % of one or more comonomers selected from a group consisting of ethylene and C4 to C10 alpha-olefins;
   wherein the polymer composition has melt flow rate (MFR) according to ASTM D1238 at 230° C./2.16 kg equal to or greater than 90 g/10 min and an Izod impact resistance according to ASTM D256A at 23° C. ranging from 400 J/m to 900 J/m.

2. The polymer composition of claim 1, wherein the matrix phase comprises a polypropylene-based polymer selected from a group consisting of polypropylene homopo-

TABLE 1

Reactor grade samples (S0 and B0) and visbroken samples after peroxide addition.

| Sample | — | S0 | S1 | S2 | S3 | B0 | B3 | T0 | T1 | T2 | T3 | T4 |
|---|---|---|---|---|---|---|---|---|---|---|---|---|
| Peroxide Level | ppm | 0 | 250 | 500 | 750 | 0 | 750 | 0 | 250 | 500 | 750 | 1000 |
| MFR 230° C./2.16 kg | g/10 min | 29 | 65 | 98 | 115 | 34 | 98 | 25 | 60 | 95 | 130 | 170 |
| Flex Modulus Secant at 1% | MPa | 757 | 656 | 662 | 640 | 909 | 678 | 840 | 790 | 750 | 740 | 735 |
| Izod at 23° C. | J/m | 634 | 595 | 559 | 499 | 81 | 31 | 614 | 564 | 539 | 165 | 132 |
| Izod at −20° C. |  | 76 | 69 | 61 | 56 | 54 | 19 | — | — | — | — | — |
| Instrumented Drop Impact at −30° C., Avg. Total Energy | J | — | — | — | — | — | — | 19.2 | 20.2 | 19.2 | 18.3 | 19.2 |
| Instrumented Drop Impact at −30° C., Avg. Percent Ductility | % | — | — | — | — | — | — | 70 | 100 | 90 | 90 | 80 |
| Tensile at Yield | MPa | 17 | 17 | 17 | 16 | 16 | 14 | 18 | 18 | 18 | 18 | 18 |
| Tensile at Rupture |  | 15 | 12 | 13 | 14 | 14 | 13 | 15 | 12 | 11 | 12 | 9 |
| Elongation at Yield | % | 7 | 8 | 8 | 8 | 4 | 4 | 6 | 7 | 7 | 7 | 7 |
| Elongation at Rupture |  | 680 | 88 | 47 | 21 | 14 | 5 | 300 | 60 | 40 | 24 | 17 |
| Xylene Solubles |  | 32 | — | 33 | — | 22 | — | 31 | — | — | — | — |
| Amorphous Ethylene |  | 34.9 | — | 33.1 | — | 47.0 | 47.0 | 33.1 | — | — | — | — |
| Mz | kDa | 939.4 | 480.8 | 425.3 | 476.7 | 867.7 | 787.2 | — | — | — | — | — |
| Mw/Mn-Total composition | — | 12.2 | — | 8 | 7.2 | 11.1 | 8 | — | — | — | — | — |
| Mw/Mn-Soluble Phase (Rubber) | — | 22.2 | — | 14.1 | 10.7 | 21.3 | 15.5 | — | — | — | — | — | lymer and polypropylene copolymer comprising equal to or less than 5 wt % of one or more comonomers selected from a group consisting of ethylene and C4 to C10 alpha-olefins.

3. The polymer composition of claim 1, wherein the comonomer in the elastomeric rubber phase is ethylene.

4. The polymer composition of claim 1, wherein the polymer composition has a fraction of xylene solubles according to ASTM D5492 equal to or greater than 20%.

5. The polymer composition of claim 1, wherein the polymer composition is visbroken in an extruder in the presence of a peroxide agent.

6. The polymer composition of claim 5, wherein the peroxide agent is one or more selected from a group consisting of 2,5-Dimethyl-2,5-di(tert-butylperoxy)hexane, dicumyl peroxide, and tert-butyl dicumylperoxide.

7. The polymer composition of claim 1, wherein the polymer composition has a melt flow rate (MFR) according to ASTM D1238 at 230° C/2.16 kg, before visbreaking, ranging from 10 g/10min to 50 g/10min.

8. The polymer composition of claim 1, wherein the polymer composition has a melt flow rate (MFR) according to ASTM D1238 at 230° C/2.16 kg, before visbreaking, ranging from 25 g/10min to 35 g/10min.

9. The polymer composition of claim 1, wherein the polymer composition has an amorphous intrinsic viscosity (IV) measured according to ASTM D445 in decaline at 135° C., before visbreaking, between 1.9 dL/g and 3.6 dL/g.

10. The polymer composition of claim 1, wherein the polymer composition has an amorphous intrinsic viscosity (IV) measured according to ASTM D445 in decaline at 135° C., after visbreaking, between 0.9 dL/g and 2.2 dL/g.

11. The polymer composition of claim 1, wherein the polymer composition has an Izod impact according to ASTM D256A at −20° C. in the range of 55 J/m to 150 J/m.

12. The polymer composition of claim 1, wherein the polymer composition has a molecular weight (Mz) in the range of 400 kDa to 600 kDa, after visbreaking.

13. The polymer composition of claim 1, wherein the polymer composition exhibits a tensile stress at yield according to ASTM D638 in the range of 14 MPa to 22 MPa.

14. The polymer composition of claim 1, wherein the polymer composition exhibits a flexural modulus secant at 1% according to ASTM D790 in the range of 600 MPa to 950 MPa.

15. The polymer composition of claim 1, wherein the polymer composition comprises antioxidants, pigments, fillers, reinforcements, adhesion-promoting agents, biocides, whitening agents, nucleating agents, anti-statics, anti-blocking agents, processing aids, flame-retardants, plasticizers, and light stabilizers.

16. An article comprising the polymer composition according to claim 1.

17. The article of claim 16, wherein the article is prepared by a method selected from a group consisting of extrusion molding, coextrusion molding, extrusion coating, injection molding, cast film extrusion, blown film extrusion, foaming, extrusion blow-molding, injection stretched blow-molding, rotomolding, pultrusion, calendering, additive manufacturing, and lamination.

* * * * *